United States Patent
Qian et al.

(10) Patent No.: US 10,169,459 B2
(45) Date of Patent: Jan. 1, 2019

(54) INTELLIGENT COLLECTING AND SHARING METHOD AND MOBILE TERMINAL

(71) Applicant: HUIZHOU TCL MOBILE COMMUNICATION CO., LTD., Huizhou, Guangdong (CN)

(72) Inventors: Wen Qian, Huizhou (CN); Hongwei Qiao, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 484 days.

(21) Appl. No.: 14/436,676

(22) PCT Filed: Apr. 2, 2014

(86) PCT No.: PCT/CN2014/074633
§ 371 (c)(1),
(2) Date: Apr. 17, 2015

(87) PCT Pub. No.: WO2015/066995
PCT Pub. Date: May 14, 2015

(65) Prior Publication Data
US 2016/0026714 A1  Jan. 28, 2016

(30) Foreign Application Priority Data

Nov. 8, 2013  (CN) .......................... 2013 1 0554552

(51) Int. Cl.
*G06F 17/30* (2006.01)
*H04M 1/725* (2006.01)
*H04W 88/02* (2009.01)

(52) U.S. Cl.
CPC .. *G06F 17/30864* (2013.01); *G06F 17/30389* (2013.01); *G06F 17/30477* (2013.01);
(Continued)

(58) Field of Classification Search
None
See application file for complete search history.

(56) References Cited

U.S. PATENT DOCUMENTS 6,493,702 B1  12/2002 Adar et al.
2003/0046290 A1  3/2003 Yamada
(Continued)

FOREIGN PATENT DOCUMENTS

CN  1901563 A  1/2007
CN  103559288 A  3/2012
(Continued)

OTHER PUBLICATIONS

English Abstract of CN103559288 A.
English Abstract of CN103092941 A.
English Abstract of CN102385607 A.

*Primary Examiner* — Alex Gofman
*Assistant Examiner* — Umar Mian
(74) *Attorney, Agent, or Firm* — Cheng-Ju Chiang (57) ABSTRACT

An intelligent collecting and sharing method and a mobile terminal are provided. The method comprises: acquiring a type of a content currently browsed; if a collecting command triggered by the user is received, then classifying the content according to the type of the content currently browsed and storing the critical information of the currently browsed into a local favorites folder according to a save format corresponding to type of the content so that the content can be sorted and collected by the user; if a sharing command triggered by the user is received, then opening the local favorites folder automatically so that the user searches for the content to be shared in the local favorites according to the type, copying and pasting the critical information corresponding to the content to be shared for purpose of sharing.

18 Claims, 3 Drawing Sheets

(52) U.S. Cl.
CPC .. *G06F 17/30554* (2013.01); *G06F 17/30884* (2013.01); *G06F 17/30896* (2013.01); *G06F 17/30902* (2013.01); *H04M 1/72561* (2013.01); *H04W 88/02* (2013.01)

(56) References Cited

U.S. PATENT DOCUMENTS

| | | |
|---|---|---|
| 2008/0201418 A1 | 8/2008 | Krishnan et al. |
| 2008/0235145 A1* | 9/2008 | Kelley .............. G06F 17/30663 705/77 |
| 2009/0199106 A1 | 8/2009 | Jonsson et al. |
| 2010/0146402 A1* | 6/2010 | Hamilton, II .......... G06Q 10/04 715/751 |
| 2011/0157041 A1* | 6/2011 | Weiss ................. G06F 3/04883 345/173 |
| 2011/0307473 A1 | 12/2011 | Lampinen et al. |
| 2012/0216102 A1* | 8/2012 | Malla .................... G06F 17/241 715/206 |
| 2012/0240051 A1 | 9/2012 | Lampinen et al. |
| 2012/0265528 A1* | 10/2012 | Gruber .................... G10L 15/18 704/235 |
| 2013/0151518 A1 | 6/2013 | Lampinen et al. |
| 2013/0275531 A1 | 10/2013 | Hahm et al. |
| 2014/0067926 A1* | 3/2014 | O'Shaughnessy ...... H04L 67/06 709/203 |
| 2014/0351340 A1* | 11/2014 | Houston ............. H04L 67/1095 709/204 |

FOREIGN PATENT DOCUMENTS

| | | |
|---|---|---|
| CN | 102724184 A | 10/2012 |
| CN | 102841896 A | 12/2012 |
| CN | 103092941 A | 5/2013 |
| CN | 102385607 A | 2/2014 |
| WO | WO2011156665 A2 | 12/2011 |

\* cited by examiner

INTELLIGENT COLLECTING AND SHARING METHOD AND MOBILE TERMINAL

RELATED APPLICATION

This application is a national phase entry under 35 USC 371 of International Patent Application No PCT/CN2014/074633 filed on Apr. 2, 2014, which claims priority from Chinese Patent Application No. 2013105545522 filed on Nov. 8, 2013, the disclosures of which are incorporated in their entirety by reference herein.

FIELD OF THE INVENTION

This application relates to the field of communication technologies, and more particularly, to an intelligent collecting and sharing method and a mobile terminal.

BACKGROUND OF THE INVENTION

With the rapid development of social networks and social applications, people hope to share what they see and hear to friends in the quickest and easiest way and save the great content shared by the other people into a mobile phone for purpose of viewing whenever and wherever possible.

However, generally, the sharing is not based on the function of a mobile terminal itself, but is based on a sharing mechanism within a website for application programs. The user can share contents of specific formats supported by sharing interfaces, which are preset in the application programs, to the friends through the sharing interfaces. Nevertheless, the formats supported by the sharing interface of each of the application programs are not necessarily the same. Therefore, if it is preset in a first application program that a sharing interface thereof can not connect to a second application program, then the user can not share the content supported by the sharing interface in the first application to the second application program, and this limits the content that can be shared.

For example, suppliers of mobile terminals set a sharing interface in the application program Wechat in advance; and the sharing interface can connect to the application program Tencent MicroBlog, and a format of the content to be shared supported by the sharing interface is of a website. After the user opens WeChat in a mobile terminal, the user can share a link of a webpage from which a great article is browsed to a circle of friends of WeChat or a homepage of Tencent MicroBlog through the preset sharing interface so that the friends thereof can browse the article shared by the user through the link. Because the preset sharing interface in WeChat can not connect to the application program Tencent's Qzone, the user can not share the link to Tencent's Qzone so as to be browsed by the friends. Furthermore, because pure text or picture is not supported by the sharing interface, the user can not share the pure text or picture to the friends through the interface.

Additionally, because contents saved in the memory of the current mobile terminal are not preset to be able to be connected to sharing interfaces of various social networking websites, they can not be identified by APIs for sharing in various social networking websites. Therefore, the user can not share the contents saved in the memory of the mobile terminal to friends in various application programs, which causes inconveniences to the user. For example, directly sharing of music is not supported by Tencent's Qzone and WeChat, so the user can not directly copy and paste the music saved in the memory card of the mobile terminal into Tencent's Qzone and WeChat.

SUMMARY OF THE INVENTION

A primary technical problem to be solved by this application is to provide an intelligent collecting method and a mobile terminal, which can save as much critical information as possible in the existing storage space based on the function of the mobile terminal itself. Thereby, a user can quickly find the desired content according to a type of the content, copy and paste the critical information corresponding to the desired content into various social networking websites for purpose of sharing to friends so that the friends can search for the content corresponding to the critical information from a network according to the critical information. Thus, the purpose of sharing the content saved in the memory card of the mobile terminal to the friends at any time is achieved.

To solve the aforesaid technical problem, a technical solution adopted by the present disclosure is to provide an intelligent collecting and sharing method, which comprises the following steps of: predefining critical information to be saved and a save format of the critical information according to types of contents supported by a mobile terminal; acquiring a type of a content currently browsed, wherein the type is of a picture, a webpage, a fiction, a music or an application; determining whether the type of the content currently browsed is one of the types supported by the mobile terminal according to the type of the content currently browsed; and receiving a collecting command triggered by a user if the determination result is "yes"; or calling a screenshot function of the mobile terminal to save the content to be shared in the form of a picture if the determination result is "no"; if the collecting command triggered by the user is received, then classifying the content according to the type of the content currently browsed and storing the critical information of the content currently browsed into a local favorites folder according to a save format corresponding to the type of the content so that the content is sorted and collected by the user; and if a sharing command triggered by the user is received, then opening the local favorites folder automatically so that the user searches for the content to be shared in the local favorites folder according to the type, copying and pasting the critical information corresponding to the content for purpose of sharing, thus the user searches for information corresponding to the critical information from a network according to the critical information.

Preferably, the collecting command triggered by the user and the sharing command triggered by the user are two arbitrary key combinations that have identical keys but have reverse orders of the keys.

Preferably, the step of if the collecting command triggered by the user is received, then classifying the content according to the type of the content currently browsed and storing the critical information of the content currently browsed into a local favorites folder according to a save format corresponding to the type of the content comprises: if the collecting command triggered by the user is received, then classifying the content according to the type of the content currently browsed and storing the critical information of the content currently browsed into a primary folder of the local favorites folder according to the save format corresponding to the type of the content, and saving the content currently browsed into a subfolder of the primary folder in a format identifiable by the mobile terminal so that the user sorts and collects the content and locally looks up the content according to the type of the content; and if a sharing command triggered by the user is received, then opening the local favorites folder automatically so that the user searches for the critical information corresponding to the content to be shared from the primary folder of the local favorites folder according to the type, and copying and pasting the critical information for purpose of sharing, thus the user searches for information corresponding to the critical information from the network according to the critical information.

To solve the aforesaid technical problem, a technical solution adopted by the present disclosure is to provide an intelligent collecting and sharing method, which comprises the following steps of acquiring a type of a content currently browsed, wherein the type is of a picture, a webpage, a fiction, a music or an application; if a collecting command triggered by the user is received, then classifying the content according to the type of the content currently browsed and storing the critical information of the content currently browsed into a local favorites folder according to a save format corresponding to the type of the content so that the content is sorted and collected by the user, and if sharing command triggered by the user is received, then opening the local favorites folder automatically so that the user searches for the content to be shared in the local favorites folder according to the type, copying and pasting the critical information corresponding to the content for purpose of sharing, thus the user searches for information corresponding to the critical information from a network according to the critical information.

Preferably, before the step of acquiring a type of a content currently browsed, the intelligent collecting and sharing method further comprises: predefining critical information to be saved and a save format of the critical information according to types of contents supported by a mobile terminal.

Preferably, after the step of acquiring a type of a content currently browsed, the intelligent collecting and sharing method further comprises: determining whether the type of the content currently browsed is one of the types supported by the mobile terminal according to the type of the content currently browsed; and receiving a collecting command triggered by a user if the determination result is "yes"; or calling a screenshot function of the mobile terminal to save the content to be shared in the form of a picture if the determination result is "no".

Preferably, the collecting command triggered by the user and the sharing command triggered by the user are two arbitrary key combinations that have identical keys but have reverse orders of the keys.

Preferably, the step of if the collecting command triggered by the user is received, then classifying the content according to the type of the content currently browsed and storing the critical information of the content currently browsed into a local favorites folder according to a save format corresponding to the type of the content comprises: if the collecting command triggered by the user is received, then classifying the content according to the type of the content currently browsed and storing the critical information of the content currently browsed into a primary folder of the local favorites folder according to the save format corresponding to the of the content, and saving the content currently browsed into a subfolder of the primary folder in a format identifiable by the mobile terminal so that the user sorts and collects the content and locally looks up the content according to the type of the content. Preferably, the step of if a sharing command triggered by the user is received, then opening the local favorites folder automatically so that the user searches for the content to be shared in the local favorites folder according to the type, copying and pasting the critical information corresponding to the content for purpose of sharing, thus the user searches for information corresponding to the critical information from a network according to the critical information, comprises: if the sharing command triggered by the user is used, then opening the local favorites folder automatically so that the user searches for the critical information corresponding to the content to be shared from the primary folder of the local favorites folder according to the type, and copying and pasting the critical information for purpose of sharing thus the user searches for information corresponding to the critical information from the network according to the critical information.

Preferably, the type of the content currently browsed is of a picture, a webpage, a fiction, a music or an application.

Preferably, in the step of it a collecting command triggered by the riser is received, then classifying the content according to the type of the content currently browsed and storing the critical information of the content currently browsed into a local favorites folder according to a save format corresponding to the type of the content so that the content is be soiled and by the user, if the type of the content currently browsed is of a picture, then the critical information of the content currently browsed is the picture and a tag, and the tag comprises a person who makes the tag and tag information, and if the collecting command triggered by lire user is received, then saving the picture currently browsed in a JPEG formal or a GIF formal anti saving the tag of the picture in a Txt text format into a picture folder of the local favorites folder to sort and collect the picture; if the type of the content currently browsed is of a webpage, then the critical information of the content currently browsed is a website anti a title of the webpage; and if the collecting command triggered by the user is received, then saving the website of the webpage currently browsed in a format of http://www.123.com and saving the title to the webpage in the Txt text formal into a webpage folder of the local favorites folder to sort and collect the webpage; it the type of the content currently browsed is of a fiction, then the critical information of the content currently browsed is a title and an author of the fiction; and if the collecting command triggered by the user is received, then saving the title and the author of the fiction currently browsed in the Txt text format into a fiction folder of the local favorites folder to sort and collect the fiction; if the type of the consent currently browsed is of a music, then the critical information of the content currently browsed is a title and an artist of the music; and if the collecting command triggered by the user is received, then saving the title and the of the music currently browsed in the Txt text format into a music folder of the local favorites folder to sort and collect the music; and if the type of the content currently browsed is of an application, then site critical information of the content currently browsed is an application and if the collecting command triggered by the user is received, then saving the application of the application currently browsed in a format of application name.apk into an application folder of the local favorites folder to son and collect the application.

Preferably, in the step of if a sharing command triggered by the user is received, then opening the local favorites folder automatically so that the user searches for the content to be shared in the local favorites folder according to the type, copying and pasting the critical information corresponding to the content for purpose of sharing, thus the user searches for information corresponding to the critical information from a network according to the critical information, if the user wants to share a picture, then searching for the picture folder in the local favorites folder, die fine into the picture folder, quickly finding the picture to be shared according to the picture and the tag through picture previewing, and then directly copying and pasting the picture and the tag of the picture to share them to friends; if the user wants to share a webpage, then searching for the webpage folder in the local favorites folder, clicking into the webpage folder and quickly finding the webpage to be shared according to the website and the title of the webpage, and then directly copying and pasting website and the title of the webpage share them to friends; it the user wants to share a fiction, then searching for the fiction folder in the local favorites folder, clicking into the fiction folder and quickly finding the fiction to be shared according to the title and the author of the fiction, and then directly copying and pasting the title and the author of the fiction to share them to friends; if the user wants to share a music, then searching for the music folder in the local favorites folder, clicking into the music folder quickly finding, the music to be shared according to the tide and the artist of the music, and then directly copying and pasting the title and the artist of the music to share them to friends; and if user wants to share an application, then searching for the application folder hi the local favorites folder, clicking into the application folder and quickly finding the application to be shared according to the application name thereof, and then directly copying and pasting the application name of the application to share it to friends.

Preferably, the method further supports extension of sharing interfaces, and the sharing interfaces are established between the local favorites folder and social networking websites in advance so that the user is able to directly send the content to be shared in the local favorites folder to the social networking websites, thus achieving a function of one-touch sharing.

To solve the aforesaid technical problem, another technical solution adopted by the present disclosure is to provide a mobile terminal, which comprises an acquiring module, a collecting module and a sharing module, wherein the acquiring module is configured to acquire a type of a content currently browsed, wherein the type is of a picture, a webpage, a fiction, a music or an application, and the acquiring module transmits the type of the content currently browsed to the collecting module; the collecting module is configured to receive the type of the content currently browsed, and if a collecting command triggered by the user is received, classify the content according to the type of the content currently browsed and store the critical information of the content currently browsed into a local favorites folder according to a save format corresponding to the type of the content so that the content is sorted and collected by the user, and the collecting module transmits the critical information to the sharing module; and the sharing module is configured to receive the critical information, and if a sharing command triggered by the user is received, open the local favorites folder automatically so that the user searches for the critical information corresponding to the content to be shared in the local favorites folder according to the type, copy and paste the critical information for purpose of sharing, thus the user searches for information corresponding to the critical information from a network according to the critical information.

Preferably, the acquiring module is further configured to predefine critical information to be saved and a save format of the critical information according to types of contents supported by the mobile terminal.

Preferably, the mobile terminal further comprises a determining module: the determining module is configured to receive the type of the content currently browsed from the acquiring module, determine whether the type of the content currently browsed is one of the types supported by the mobile terminal according to the type of the content currently browsed, and transmit the determination result and the type of the content currently browsed to the collecting module; and the collecting module is further configured to receive the determination result and the type of the content currently browsed, and receive the collecting command triggered by the user if the determination result is "yes", or call a screenshot function of the mobile terminal to save the content to be shared in the form of a picture if the determination result is "no".

Preferably, the collecting command triggered by the user and the sharing command triggered by the user are two arbitrary key combinations that have identical keys but have reverse orders of the keys.

Preferably, the collecting module is configured to, if the collecting command triggered by the user is received, classify the content according to the type of the content currently browsed and store the critical information of the content currently browsed into a primary folder of the local favorites folder according to the save format corresponding to the type of the content, and save the content currently browsed into a subfolder of the primary folder in a format identifiable by the mobile terminal so that the user sorts and collects the content and locally looks up the content according to the type of the content; and the sharing module is configured to, if a sharing command triggered by the user is received, open the local favorites folder automatically so that the user searches for the critical information corresponding to the content to be shared from the primary folder of the local favorites folder according to the type, and copy and paste the critical information for purpose of sharing, thus the user searches for information corresponding to the critical information from the network according to the critical information.

The present disclosure has the following benefits: as compared to the prior art, the present disclosure classifies the content according to the type of the content currently browsed and locally stores the critical information of the content currently browsed according to a save format corresponding to the type of the content so that the content can be sorted and collected by the user. Because only the critical information of the content currently browsed is saved, as much critical information as possible can be saved in the existing storage space; and the user can quickly find the content to be shared according to the type of the content, copy and paste the critical information corresponding to the content to be shared into various social networking websites for purpose of sharing so that the user can search for information corresponding to the critical information from a network according to the critical information, thus achieving the purpose of sharing of contents saved in the memory card of the mobile terminal.

DETAILED DESCRIPTION OF THE INVENTION

Hereinbelow, in order to achieve a thorough understanding of this application, specific details such as specific system structures, interfaces and technologies are provided for purpose of description rather than to limit this application. However, those skilled in the art should be appreciated that, this application may also be achieved in other embodiments without these specific details. In other cases, a detailed description of well-known apparatuses, circuits and methods is omitted in order to prevent the description of this application from being obscured by unnecessary details.

Figure 1:
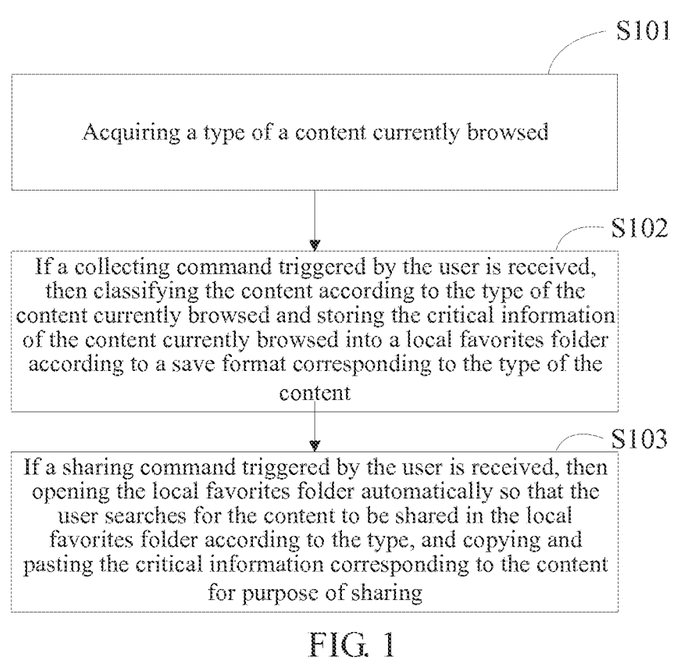
FIG. 1 is a flowchart diagram of an embodiment of an intelligent collecting and sharing method of this application.

Referring to FIG. 1, there is shown a flowchart diagram of an embodiment of an intelligent collecting and sharing method of this application. In this embodiment, the intelligent collecting and sharing method comprises the following steps of:

Step S101: acquiring a type of a content currently browsed, where the type is of a picture, a webpage, a fiction, a music or an application.

When a user opens an application program, a mobile terminal acquires a type of a content currently browsed by the user, where the type of the content currently browsed is of a picture, a webpage, a fiction, a music or an application.

Step S102: if a collecting command triggered by the user is received, then classifying the content according to the type of the content currently browsed and storing the critical information of the content currently browsed into a local favorites folder according to a save format corresponding to the type of the content.

If the collecting command triggered by the user is received by the mobile terminal, then the mobile terminal classifies the content according to the type of the content currently browsed, stores the critical information of the content currently browsed into the local favorites folder according to the save format corresponding to the type of the content so that the content can be sorted and collected by the user.

For example, if the type of the content currently browsed is of a picture, then the critical information of the picture is the picture and a tag, and the tag comprises the person who makes the tag and the tag information. If the collecting command triggered by the user is received by the mobile terminal, then the mobile terminal saves the picture currently browsed in a JPEG format or a GIF format and saves the tag of the picture in a Txt text format into a picture folder in the local favorites folder to sort and collect the picture. In this embodiment, the save formats of the picture are the JPEG format and the GIF format; and in other embodiments, the save formats of the picture may also be other picture formats supported by the mobile terminal.

If the type of the content currently browsed is of a webpage, then the critical information of the webpage is the website and the title. If the collecting command triggered by the user is received by the mobile terminal, then the mobile terminal saves the website of the webpage currently browsed in a format of http://www.123.com and save the title corresponding to the webpage in the Txt text format into a webpage folder in the local favorites folder to sort and collect the webpage.

If the type of the content currently browsed is of a fiction, then the critical information of the fiction is the fiction title and the author. If the collecting command triggered by the user is received by the mobile terminal, then the mobile terminal saves the title and the author of the fiction currently browsed in the Txt text format into a fiction folder in the local favorites folder to sort and collect the fiction.

If the type of the content currently browsed is of a music, then the critical information of the music is the title and the artist of the music. If the collecting command triggered by the user is received by the mobile terminal, then the mobile terminal saves the title and the artist of the music currently browsed in the Txt text format into a music folder in the local favorites folder to sort and collect the music.

If the type of the content currently browsed is of an application, then the critical information of the application is the application name. If the collecting command triggered by the user is received by the mobile terminal, then the mobile terminal saves the name of the application currently browsed in the format of application name.apk into an application folder in the local favorites folder to sort and collect the application.

Step S103: if a sharing command triggered by the user is received, then opening the local favorites folder automatically so that the user searches for the content to be shared in the local favorites folder according to the type, copying and pasting the critical information corresponding to the content for purpose of sharing so that the user searches for information corresponding to the critical information from a network according to the critical information.

If the sharing command triggered by the user is received by the mobile terminal, then the mobile terminal displays the sharing function and automatically jumps to the local favorites folder and opens the favorites folder so that the user searches for the content to be shared in the local favorites folder according to the type and the critical information of the content. After the content to be shared is obtained through searching, copies and pastes the critical information corresponding to the content to be shared into various social networking websites for purpose of sharing so that the user searches for information corresponding to the critical information form the network according to the critical information.

For example, if the sharing command triggered by the user is received by the mobile terminal, then the mobile terminal displays the sharing function and automatically jumps to the local favorites folder and opens the favorites folder so that the user searches for the content to be shared in the local favorites folder according to the type and the critical information of the content.

If the user wants to share a picture, then the user searches for the picture folder in the local favorites folder, clicks into the picture folder, quickly finds the picture to be shared according to the picture and the tag through picture previewing, and then directly copies and pastes the picture and the tag of the picture into various social networks to share them to friends. Then, the friends can view the shared picture and related information thereof.

If the user wants to share a webpage, then the user searches for the webpage folder in the local favorites folder, clicks into the webpage folder and quickly finds the webpage to be shared according to the website and the title of the webpage, and then directly copies and pastes the website and the title of the webpage into various social networks to share them to friends. Then, the friends can search for the webpage from the network according to the website and the title and view information corresponding to the website and the title.

If the user wants to share a fiction, then the user searches for the fiction folder in the local favorites folder, clicks into the fiction folder and quickly finds the fiction to be shared according to the fiction title and the author, and then directly copies and pastes the title and the author of the fiction into various social networks to share them to the friends. Then, the friends can search for the fiction from the network according to the fiction title and the author and view the fiction title, the brief introduction and the downloading address of the fiction.

If the user wants to share a music, then the user searches for the music folder in the local favorites folder, clicks into the music folder and quickly finds the fiction to be shared according to the title and the artist of the music, and then directly copies and pastes the title and the artist of the music into various social networks to share them to the friends. Then, the friends can search for the music from the network according to the title and the artist of the music, view the title and the downloading address of the music and download the music according to the downloading address.

If the user wants to share an application, then the user searches for the application folder in the local favorites folder, clicks into the application folder and finds the application to be shared according to the application name, and then directly copies and pastes the application name of the application into various social networks to share it to the friends. Then, the friends can search for the application from the network according to the application name, view the name and the downloading address of the application and download the application according to the downloading address.

In this embodiment, the user copies and pastes the critical information of the content locally collected into various social networks for purpose of sharing; and in other embodiments, the user may also copy and paste the critical information of the content locally collected into session windows of various instant-session application programs for purpose of sharing.

It should be appreciated that, the mobile terminal further supports extension of sharing interfaces. Sharing interfaces can be established between the local favorites folder and the social networking websites in advance so that the user can directly send the content of the local favorites folder to the social networking websites, thus achieving the function of one-touch sharing. For example, sharing interfaces are preset in the mobile terminal; and when the content to be shared is found in the local favorites folder through searching, the user long-presses the content to be shared. Then, a dialog box that displays a preset sharing interface such as "sharing to Sina MicroBlog", "sharing to Qzone" or the like pops up in the mobile terminal, and the user can select a sharing interface therefrom and directly share the content to be shared to the corresponding social networking website, thus achieving one-touch sharing.

Preferably, after the content to be shared is selected by the user, the mobile terminal searches for the latest related information and downloading address from the network by taking the critical information to be shared as an index, and extracts critical information from the latest related information obtained through searching so that the user can share the critical information to the friends thereof.

Figure 2:
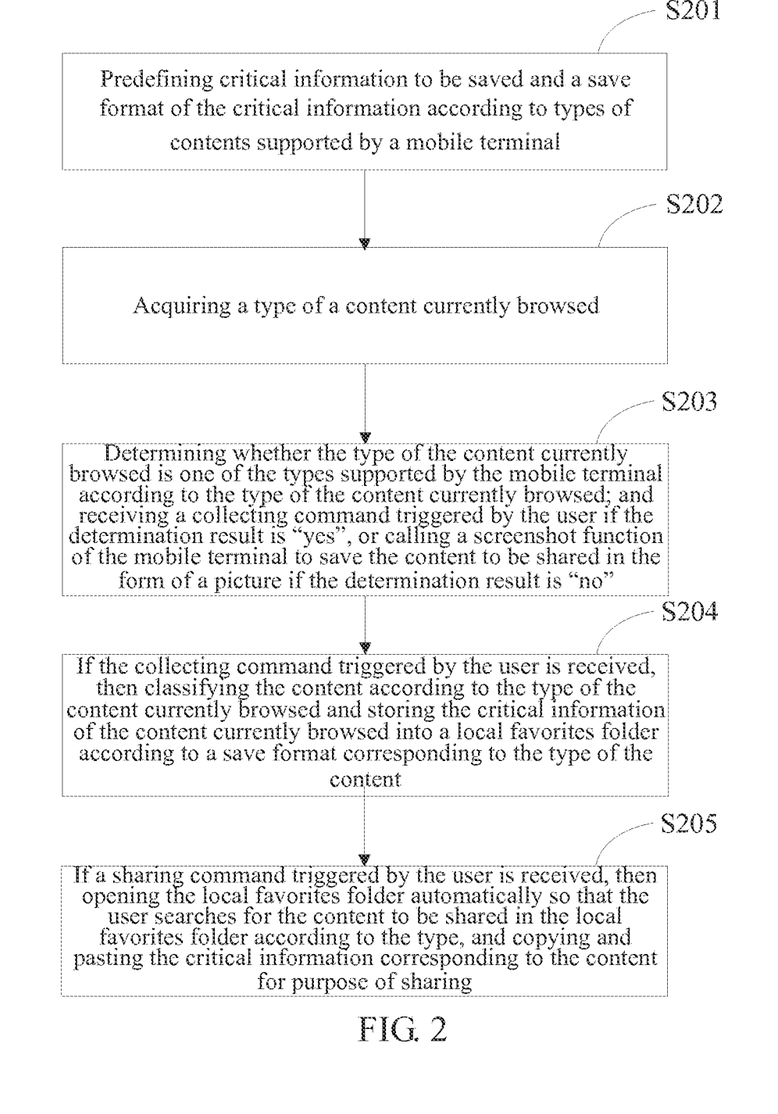
FIG. 2 is a flowchart diagram of another embodiment of the intelligent collecting and sharing method of this application.

Referring to FIG. 2, there is shown a flowchart diagram of another embodiment of the intelligent collecting and sharing method of this application. In this embodiment, the intelligent collecting and sharing method comprises the following steps of:

Step S201: predefining critical information to be saved and a save format of the critical information according to types of contents supported by a mobile terminal.

The critical information of various types to be saved and the save format of the critical information are predefined according to the types of the contents supported by the mobile terminal. The types include a picture type, a webpage type, a fiction type, a music type and an application type.

For example, if a type of a content supported by the mobile terminal is of a picture, then the picture and the tag are defined as the critical information to be saved, and the save formats of the picture are defined as a JPEG format and a GIF format and the save format of the tag is defined as a Txt text format.

If the type of the content is of a webpage, then the website and the title are defined as the critical information to be saved, and the save format of the website is defined as a format of http://www.123.com and the save format of the title is defined as the Txt text format.

If the type of the content is of a fiction, then the fiction title and the author are defined as the critical information to be saved, and the save formats of the fiction title and the author are both defined as the Txt text format.

If the type of the content is of a music, then the title and the artist of the music are defined as the critical information to be saved, and the save formats of the title and the artist of the music are both defined as the Txt text format.

If the type of the content is of an application, then the application name is defined as the critical information to be saved, and the save format of the application name is defined as the Txt text format.

Step S202: acquiring a type of a content currently browsed.

When the user opens an application, the mobile terminal acquires the type of the content currently browsed by the user, where the type of the content currently browsed is of a picture, a webpage, a fiction, a music, or an application.

Step S203: determining whether the type of the content currently browsed is one of the types supported by the mobile terminal according to the type of the content currently browsed; and receiving a collecting command triggered by the user if the determination result is "yes"; or calling a screenshot function of the mobile terminal to save the content to be shared in the form of a picture if the determination result is "no".

The mobile terminal determines whether the type of the content currently browsed by the user is one of the types supported by the mobile terminal according to the type of the content currently browsed. If the determination result is "yes", then the mobile terminal receives the collecting command triggered by the user and a step S204 is executed; and if the determination result is "no", then the screenshot function of the mobile terminal is called to save the content to be shared in the form of the JPEG format picture and the GIF format picture into a picture folder in a local favorites folder.

Step S204: if the collecting command triggered by the user is received, then classifying the content according to the type of the content currently browsed and storing the critical information of the content currently browsed into the local favorites folder according to a save format corresponding to the type of the content.

If the collecting command triggered by the user is received by the mobile terminal, then the mobile terminal classifies the content according to the type of the content currently browsed and stores the critical information of the content currently browsed into the local favorites folder according to the save format corresponding to the type of the content so that the content can be sorted and collected by the user. The collecting command triggered by the user is two arbitrary keys combined in an order.

For example, if the mobile terminal senses that a power button and a volume button are successively pressed by the user, then it represents that the collecting command is triggered by the user and the user wants to collect the content currently browsed. The mobile terminal sorts and collects the content according to the type of the content currently browsed.

If the type of the content currently browsed is of a picture, then the critical information of the picture is the picture and the tag, and the tag comprises the person who makes the tag and the tag information. The mobile terminal saves the picture currently browsed in a JPEG format or a GIF format and save the tag of the picture in a Txt text format into a picture folder in the local favorites folder to sort and collect the picture. In this embodiment, the save formats of the picture are the JPEG format and the GIF format; and in other embodiments, the save formats of the picture may also be other picture formats supported by the mobile terminal.

If the type of the content currently browsed is of a webpage, then the critical information of the webpage is the website and the title. The mobile terminal saves the website of the webpage currently browsed in a format of http://www.123.com and saves the title corresponding to the webpage in the Txt text format into a webpage folder in the local favorites folder to sort and collect the webpage. If the type of the content currently browsed is of a fiction, then the critical information of the fiction is the fiction title and the author. If the collecting command triggered by the user is received by the mobile terminal, then the mobile terminal saves the title and the author of the fiction currently browsed in the Txt text format into a fiction folder in the local favorites folder to sort and collect the fiction.

If the type of the content currently browsed is of a music, then the critical information of the music is the title and the artist of the music. The mobile terminal saves the title and the artist of the music currently browsed in the Txt text format into a music folder in the local favorites folder to sort and collect the music.

If the type of the content currently browsed is of an application, then the critical information of the application is the application name. The mobile terminal saves the name of the application currently browsed in the format of application name.apk into an application folder in the local favorites folder to sort and collect the application.

Optionally, if the collecting command triggered by the user is received by the mobile terminal, then the mobile terminal classifies the content according to the type of the content currently browsed, stores the critical information of the content currently browsed into a primary folder of the local favorites folder according to the save format corresponding to the type of the content, and saves the content currently browsed into a subfolder of the primary folder in a format identifiable by the mobile terminal so that the user sorts and collects the content and locally looks up the content according to the type of the content.

For example, the mobile terminal saves the content comprised in a webpage currently browsed into a subfolder of the webpage folder of the local favorites folder in a reading format identifiable by the mobile terminal so that the user can also view the related content comprised in the webpage even when not being connected to the internet.

The mobile terminal saves the specific content comprised in a fiction currently browsed into a subfolder of the fiction folder of the local favorites folder in a reading format (e.g., the Txt text format) identifiable by the mobile terminal so that the fiction can be read by the user.

The mobile terminal saves a music currently browsed into a subfolder of the music folder of the local favorites folder in a playing format identifiable by the mobile terminal so that the music can be played and enjoyed by the user.

The mobile terminal saves an installation package of an application currently browsed into a subfolder of the application folder of the local favorites folder in a format identifiable by the mobile terminal so that the application can be installed by the user.

Step S205: if a sharing command triggered by the user is received, then opening the local favorites folder automatically so that the user locally searches for the content to be shared according to the type, and copying and pasting the critical information corresponding to the content for purpose of sharing so that the user searches for information corresponding to the critical information from a network according to the critical information.

If the sharing command triggered by the user is received by the mobile terminal, then the mobile terminal displays the sharing function, automatically jumps to the local favorites folder and opens the favorites folder so that the user searches for the content to be shared in the local favorites folder according to the type and the critical information of the content. After the content to be shared is obtained through searching, the user copies and pastes the critical information corresponding to the content to be shared into various social networking websites for purpose of sharing so that the user searches for information corresponding to the critical information from the network according to the critical information. The collecting command triggered by the user and the sharing command triggered by the user are two key combinations that have identical keys but have reverse orders of the keys.

For example, if the mobile terminal senses that the volume button and the power button are successively pressed by the user, then it represents that the sharing command is triggered by the user and the user wants to share the content stored in the local favorites folder. Then, the mobile terminal displays the sharing function, automatically jumps to the local favorites folder and opens the favorites folder so that the user searches for the content to be shared in the local favorites folder according to the type and the critical information of the content.

If the user wants to share a picture, then the user searches for the picture folder in the local favorites folder, clicks into the picture folder, quickly finds the picture to be shared according to the picture and the tag through picture previewing, and then directly copies and pastes the picture and the tag of the picture into various social networks to share them to friends so that the friends can view the shared picture and related information thereof.

If the user wants to share a webpage, then the user searches for the webpage folder in the local favorites folder, clicks into the webpage folder and quickly finds the webpage to be shared according to the website and the title of the webpage, and then directly copies and pastes the website and the title of the webpage into various social networks to share them to the friends so that the friends can search for the webpage from the network according to the website and the title and view information corresponding to the website and the title.

If the user wants to share a fiction, then the user searches for the fiction folder in the local favorites folder, clicks into the fiction folder and quickly finds the fiction to be shared according to the title and the author of the fiction, and then directly copies and pastes the title and the author of the fiction into various social networks to share them to the friends so that the friends can search for the fiction from the network according to the title and the author of the fiction and view the fiction name, and the brief introduction and the downloading address of the fiction.

If the user wants to share a music, then the user searches for the music folder in the local favorites folder, clicks into the music folder and quickly finds the fiction to be shared according to the title and the artist of the music, and then directly copies and pastes the title and the artist of the music into various social networks to share them to the friends so that the friends can search for the music from the network according to the title and the artist of the music and view the title and the downloading address of the music and download the music according to the downloading address.

If the user wants to share an application, then the user searches for the application folder in the local favorites folder, clicks into the application folder and finds the application to be shared according to the application name, and then directly copies and pastes the application name into various social networks to share it to the friends so that the friends can search for the application from the network according to the application name and view the name and the downloading address of the application and download the application according to the downloading address.

Optionally, if the sharing command triggered by the user is received by the mobile terminal, then the mobile terminal opens the local favorites folder automatically so that the user searches for the critical information corresponding to the content to be shared from the primary folder of the local favorites folder according to the type of the content, and copies and pastes the critical information into various social networks to share it to the friends so that the friends can search for the content from the network according to the critical information and view related information corresponding to the critical information. The user may also search for the specific content in the subfolder of the primary folder of the local favorites folder and then copy and paste the specific content obtained through searching for purpose of sharing.

In this embodiment, the user copies and pastes the critical information of the content locally collected into various social networks for purpose of sharing; and in other embodiments, the user may also copy and paste the critical information of the content locally collected into session windows of various instant-session application programs for purpose of sharing.

It should be appreciated that, the mobile terminal further supports extension of sharing interfaces. Sharing interfaces can be established between the local favorites folder and the social networking websites in advance so that the user can directly send the content of the local favorites folder to the social networking websites, thus achieving the function of one-touch sharing. For example, sharing interfaces are preset in the mobile terminal; and when the content to be shared is found in the local favorites folder through searching, the user long-presses the content to be shared. Then, a dialog box that displays a preset sharing interface such as "sharing to Sina MicroBlog", "sharing to Qzone" or the like pops up in the mobile terminal. Then the user can select a sharing interface therefrom and directly share the content to be shared to the corresponding social networking website, thus achieving one-touch sharing.

Preferably, after the content to be shared is selected by the user, the mobile terminal searches for the latest related information and the downloading address from the network by taking the critical information to be shared as an index, and extracts critical information from the latest related information obtained through searching so that the user can share the critical information to the friends thereof.

Figure 3:
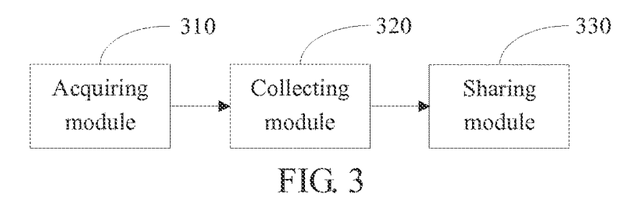
FIG. 3 is a schematic structural view of an embodiment of a mobile terminal of this application.

Referring to FIG. 3, there is shown a schematic structural view of an embodiment of a mobile terminal of this application. In this embodiment, the mobile terminal comprises an acquiring module 310, a collecting module 320, and a sharing module 330.

The acquiring module 310 is configured to acquire a type of a content currently browsed, where the type is of a picture, a webpage, a fiction, a music or an application. For example, when the user opens an application program, the acquiring module 310 acquires the type of the content currently browsed by the user, where the type of the content currently browsed is of a picture, a webpage, a fiction, a music or an application. The acquiring module 310 transmits the type of the content currently browsed to the collecting module 320.

The collecting module 320 is configured to receive the type of the content currently browsed, and if a collecting command triggered by the user is received, classify the content according to the type of the content currently browsed and store the critical information of the content currently browsed into a local favorites folder according to a save format corresponding to the type of the content so that the content can be sorted and collected by the user.

For example, if the collecting command triggered by the user is received by the collecting module 320, then the collecting module 320 classifies the content according to the type of the content currently browsed, and stores the critical information of the content currently browsed into the local favorites folder according to the save format corresponding to the type of the content so that the content can be sorted and collected by the user.

For example, if the type of the content currently browsed by the user is of a picture, then the critical information of the picture is the picture and the tag, and the tag comprises the person who makes that tag and the tag information. If the collecting command triggered by the user is received by the collecting module 320, then the collecting module 320 saves the picture currently browsed in a JPEG format and a GIF format and saves the tag of the picture in a Txt text format into a picture folder in the local favorites folder to sort and collect the picture. In this embodiment, the save formats of the picture are the JPEG format and the GIF format; and in other embodiments, the save formats of the picture may also be other picture formats supported by the mobile terminal.

If the type of the content currently browsed by the user is of a webpage, then the critical information of the webpage is the website and the title. If the collecting command triggered by the user is received by the collecting module 320, then the collecting module 320 saves the website of the webpage currently browsed in a format of http://www.123.com and saves the title corresponding to the webpage in the Txt text format into a webpage folder in the local favorites folder to sort and collect the webpage.

If the type of the content currently browsed by the user is of a fiction, then the critical information of the fiction is the fiction title and the author. If the collecting command triggered by the user is received by the collecting module 320, then the collecting module 320 saves the title and the author of the fiction currently browsed in the Txt text format into a fiction folder in the local favorites folder to sort and collect the fiction.

If the type of the content currently browsed by the user is of a music, then the critical information of the music is the title and the artist of the music. If the collecting command triggered by the user is received by the collecting module 320, then the collecting module 320 saves the title and the artist of the music currently browsed in the Txt text format into a music folder in the local favorites folder to sort and collect the music.

If the type of the content currently browsed is of an application, then the critical information of the application is the application name. If the collecting command triggered by the user is received by the collecting module 320, then the collecting module 320 saves the name of the application currently browsed in the format of application name.apk into an application folder in the local favorites folder to sort and collect the application.

The collecting module 320 transmits the critical information to the sharing module 330.

The sharing module 330 is configured to receive the critical information, and if a sharing command triggered by the user is received, open the local favorites folder automatically so that the user searches for the critical information corresponding to the content to be shared in the local favorites folder according to the type, copy and paste the critical information for purpose of sharing so that the user searches for information corresponding to the critical information from a network according to the critical information.

For example, if the sharing command triggered by the user is received by the sharing module 330, then the sharing module 330 displays the sharing function, automatically jumps to the local favorites folder and opens the favorites folder so that the user searches for the content to be shared in the local favorites folder according to the type and the critical information of the content. After the content to be shared is obtained through searching, the user copies and pastes the critical information corresponding to the content to be shared into various social networking websites for purpose of sharing so that the user searches for information corresponding to the critical information from the network according to the critical information.

For example, if the sharing command triggered by the user is received by the sharing module 330, then the sharing module 330 displays the sharing function, automatically jumps to the local favorites folder and opens the favorites folder so that the user searches for the content to be shared according to the type and the critical information of the content.

If the user wants to share a picture, then the user searches for the picture folder in the local favorites folder, clicks into the picture folder, quickly finds the picture to be shared according to the picture and the tag through picture previewing, and then directly copies and pastes the picture and the tag of the picture into various social networks to share them to the friends so that the friends can view the shared picture and related information thereof.

If the user wants to share a webpage, then the user searches for the webpage folder in the local favorites folder, clicks into the webpage folder and quickly finds the webpage to be shared according to the website and the title of the webpage, and then directly copies and pastes the website and the title of the webpage into various social networks to share them to the friends so that the friends can search for the webpage from the network according to the website and the title and view information corresponding to the website and the title.

If the user wants to share a fiction, then the user searches for the fiction folder in the local favorites folder, clicks into the fiction folder and quickly finds the fiction to be shared according to the fiction title and the author, and then directly copies and pastes the title and the author of the fiction into various social networks to share them to the friends so that the friends can search for the fiction from the network according to the fiction title and the author and view the fiction title, and the brief introduction and the downloading address of the fiction.

If the user wants to share a music, then the user searches for the music folder in the local favorites folder, clicks into the music folder and quickly finds the music to be shared according to the title and the artist of the music, and then directly copies and pastes the title and the artist of the music into various social networks to share them to the friends so that the friends can search for the music from the network according to the title and the artist of the music and view the title and the downloading address of the music and download the music according to the downloading address.

If the user wants to share an application, then the user searches for the application folder in the local favorites folder, clicks into the application folder and finds the application to be shared according to the application name, and then directly copies and pastes the application name into various social networks to share it to the friends so that the friends can search for the application from the network according to the application name, view the name and the downloading address of the application and download the application according to the downloading address.

In this embodiment, the user copies and pastes the critical information of the content locally collected into various social networks for purpose of sharing; and in other embodiments, the user may also copy and paste the critical information of the content locally collected into session windows of various instant-session application programs for purpose of sharing.

It should be appreciated that, the sharing module 330 further supports extension of sharing interfaces. Sharing interfaces can be established between the local favorites folder and the social networking sites in advance so that the user can directly send the content of the local favorites folder to the social networking websites, thus achieving the function of one-touch sharing. For example, sharing interfaces are preset in the sharing module 330, and when the content to be shared is found by the user in the local favorites folder through searching, the user long-presses the content to be shared. Then, a dialog box that displays a preset sharing interface such as "sharing to Sina MicroBlog", "sharing to Qzone" or the like pops up in the sharing module 330, and the user can select a sharing interface therefrom and directly share the content to be shared to the corresponding social networking website, thus achieving one-touch sharing.

Preferably, after the content to be shared is selected by the user, the sharing module 330 searches for the latest related information and the downloading address from the network by taking the critical information to be shared as an index, and extracts critical information from the latest related information obtained through searching so that the user can share the critical information to the friends thereof.

Figure 4:
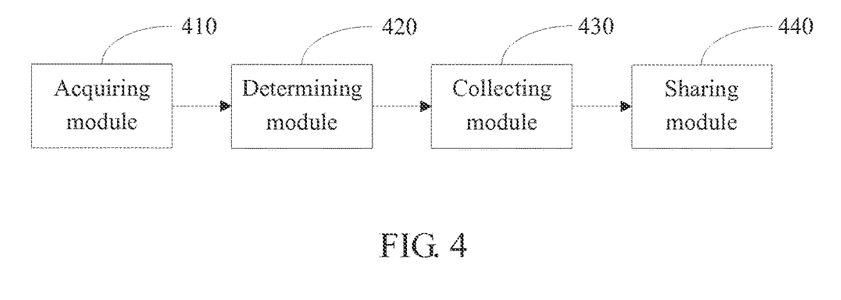
FIG. 4 is a schematic structural view of another embodiment of the mobile terminal of this application.

Referring to FIG. 4, there is shown a schematic structural view of another embodiment of the mobile terminal of this application. In this embodiment, the mobile terminal comprises an acquiring module 410, a determining module 420, a collecting module 430 and a sharing module 440.

The acquiring module 410 is configured to predefine critical information to be saved and a save format of the critical information according to types of contents supported by the mobile terminal. For example, the acquiring module 410 predefines the critical information to be saved of each of the various types and the save format of the critical information according to the types of the contents supported by the mobile terminal. The types comprise a picture type, a webpage type, a fiction type, a music type and an application type.

For example, if a type of a content supported by mobile terminal is of a picture, then the acquiring module 410 defines the picture and the tag as the critical information to be saved, and defines the save format of the picture as a JPEG format and a GIF format, and the save format of the tag as a Txt text format.

If the type of the content supported by the mobile terminal is of a webpage, then the acquiring module 410 defines the website and the title as the critical information to be saved, and defines the save format of the website as a format of http://www.123.com and the save format of the title as the Txt text format.

If the type of the content supported by the mobile terminal is of a fiction, then the acquiring module 410 defines the fiction title and the author as the critical information to be saved, and defines the save formats of the fiction title and the author as the Txt text format.

If the type of the content supported by the mobile terminal is of a music, then the acquiring module 410 defines the title and the artist of the music as the critical information to be saved, and defines the save formats of the title and the artist of the music as the Txt text format.

If the type of the content supported by the mobile terminal is of an application, then the acquiring module 410 defines the application name as the critical information to be shared, and defines the save format of the application name as the format of application name .apk.

The acquiring module 410 is further configured to acquire a type of a content currently browsed, where the type is of a picture, a webpage, a fiction, a music or an application. For example, when the user opens an application program, the acquiring module 410 acquires the type of the content currently browsed by the user, where the type of the content currently browsed is of a picture, a webpage, a fiction, a music or an application. The acquiring module 410 transmits the type of the content currently browsed to the determining module 420.

The determining module 420 is configured to receive the type of the content currently browsed from the acquiring module 410, determine whether the type of the content currently browsed is one of the types supported by the mobile terminal according to the type of the content currently browsed. For example, the determining module 420 determines whether the type of the content currently browsed by the user is one of the types supported by the mobile terminal according to the type of the content currently browsed. The determining module 420 transmits the determination result and the type of the content currently browsed to the collecting module 430.

The collecting module 430 is configured to receive the determination result and the type of the content currently browsed, and receive a collecting command triggered by the user if the determination result is "yes", or call a screenshot function of the mobile terminal to save the content to be shared in the picture formats of a JPEG format and a GIF format into a picture folder in a local favorites folder if the determination result is "no".

The collecting module 430 is further configured to, if the collecting command triggered by the user is received, classify the content according to the type of the content currently browsed and store the critical information of the content currently browsed into the local favorites folder according to the save format corresponding to the type of the content so that the content can be sorted and collected by the user. The collecting command triggered by the user is an arbitrary combination of two keys that have an order. For example, if the collecting command triggered by the user is received by the collecting module 430, then the collecting module 430 classifies the content according to the type of the content currently browsed, and stores the critical information of the content currently browsed into the local favorites folder according to the save format corresponding to the type of the content so that the content can be sorted and collected by the user. The collecting command triggered by the user is an arbitrary combination of two keys that have an order.

For example, if the collecting module 430 senses that the power button and the volume button are successively pressed by the user, it represents that the collecting command is triggered by the user and the user wants to collect the content currently browsed. The collecting module 430 sorts and collects the content according to the type of the content currently browsed.

If the type of the content currently browsed by the user is of a picture, then the critical information of the picture is the picture and the tag, and the tag comprises the person who makes the tag and the tag information. The collecting module 430 saves the picture currently browsed in the JPEG format and the GIF format and save the tag of the picture in the Txt text format into a picture folder in the local favorites folder to sort and collect the picture. In this embodiment, the save formats of the picture are the JPEG format and the GIF format; and in other embodiments, the save formats of the picture may also be other picture formats supported by the mobile terminal.

If the type of the content currently browsed by the user is of a webpage, then the critical information of the webpage is the website and the title. The collecting module 430 saves the website of the webpage currently browsed in the format of http://www.123.com and save the title corresponding to the webpage in the Txt text format into a webpage folder in the local favorites folder to sort and collect the webpage.

If the type of the content currently browsed by the user is of a fiction, then the critical information of the fiction is the fiction title and the author. The collecting module 430 saves the title and the author of the fiction currently browsed in the Txt text format into a fiction folder in the local favorites folder to sort and collect the fiction.

If the type of the content currently browsed by the user is of a music, then the critical information of the music is the title and the artist of the music. The collecting module 430 saves the title and the artist of the music currently browsed in the Txt text format into a music folder in the local favorites folder to sort and collect the music.

If the type of the content currently browsed is of an application, then the critical information of the application is the application name. The collecting module 430 saves the name of the application currently browsed in the format of application name.apk into an application folder in the local favorites folder to sort and collect the application.

Optionally, the collecting module 430 is further configured to, if the collecting command triggered by the user is received, classify the content according to the type of the content currently browsed and store the critical information of the content currently browsed into a primary folder of the local favorites folder according to the save format corresponding to the type of the content, and save the content currently browsed into a subfolder of the primary folder in a format identifiable by the mobile terminal so that the user sorts and collects the content and locally looks up the content according to the type of the content.

For example, the collecting module 430 saves the content comprised in a webpage currently browsed into a subfolder of the webpage folder of the local favorites folder in a reading format identifiable by the mobile terminal so that the user can also view the related content comprised in the webpage when not being connected to the internet.

The collecting module 430 saves the specific content comprised in a fiction currently browsed into a subfolder of the fiction folder of the local favorites folder in a reading format (e.g., the Txt text format) identifiable by the mobile terminal so that the fiction can be read by the user.

The collecting module 430 saves a music currently browsed into a subfolder of the music folder in the local favorites folder in a playing format identifiable by the mobile terminal so that the music can be played and enjoyed by the user.

The collecting module 430 saves the installation package of an application currently browsed into a subfolder of the application folder of the local favorites folder in a format identifiable by the mobile terminal so that the application can be installed by the user.

The collecting module 430 transmits the critical information to the sharing module 440.

The sharing module 440 is configured to, ifs sharing command triggered by the user is received, open the local favorites folder automatically so that the user searches for the critical information corresponding to the content to be shared from the primary folder of the local favorites folder according to the type, and copy and paste the critical information for purpose of sharing so that the user searches for information corresponding to the critical information from the network according to the critical information.

For example, if the sharing command triggered by the user is received by the sharing module 440, then the sharing module 440 displays the sharing function, automatically jumps to the local favorites folder and opens the favorites folder so that the user searches for the content to be shared in the local favorites folder according to the type and the critical information of the content. After the content to be shared is obtained through searching, the user copies and pastes the critical information corresponding to the content to be shared into various social networking websites for purpose of sharing so that the user searches for the information corresponding to the critical information from the network according to the critical information. The collecting command triggered by the user and the sharing command triggered by the user are two key combinations that have identical keys but have reverse orders of the keys.

For example, if the sharing module 440 senses that the volume button and the power button are successively pressed by the user, then it represents that the collecting command is triggered by the user and the user wants to share the content stored in the local favorites folder. Then, the sharing module 440 displays the sharing function, automatically jumps to the local favorites folder and opens the favorites folder so that the user searches for the content to be shared in the local favorites folder according to the type and the critical information of the content.

If the user wants to share a picture, then the user searches for the picture folder in the local favorites folder, clicks into the picture folder, quickly finds the picture to be shared according to the picture and the tag through picture previewing, and then directly copies and pastes the picture and the tag of the picture into various social networks to share them to the friends so that the friends can view the shared picture and related information thereof.

If the user wants to share a webpage, then the user searches for the webpage folder in the local favorites folder, clicks into the webpage folder and quickly finds the webpage to be shared according to the website and the title of the webpage, and then directly copies and pastes the website and the title of the webpage into various social networks to share them to the friends so that the friends can search for the webpage from the network according to the website and the title and view information corresponding to the website and the title.

If the user wants to share a fiction, then the user searches for the fiction folder in the local favorites folder, clicks into the fiction folder and quickly finds the fiction to be shared according to the fiction title and the author, and then directly copies and pastes the title and the author of the fiction into various social networks to share them to the friends so that the friends can search for the fiction from the network according to the fiction title and the author and view the fiction title and the brief introduction and the downloading address of the fiction.

If the user wants to share a music, then the user searches for the music folder in the local favorites folder, clicks into the music folder and quickly finds the music to be shared according to the title and the artist of the music, and then directly copies and pastes the title and the artist of the music into various social networks to share them to the friends so that the friends can search for the music from the network according to the title and the artist of the music, view the title and the downloading address of the music and download the music according to the downloading address.

If the user wants to share an application, then the user searches for the application folder in the local favorites folder, clicks into the application folder and finds the application to be shared according to the application name, and then directly copies and pastes the application name into various social networks to share it to the friends so that the friends can search for the application from the network according to the application name, view the name and the downloading address of the application and download the application according to the downloading address.

Optionally, if the sharing command triggered by the user is received by the sharing module 440, then the sharing module 440 opens the local favorites folder automatically so that the user searches for the critical information corresponding to the content to be shared from the primary folder of the local favorites folder according to the type of the content and copies and pastes the critical information into various social networks to share it to the friends so that the user searches for related information corresponding to the critical information from the network according to the critical information. The user may also search for the specific content in the subfolder of the primary folder of the local favorites folder and then copy and paste the specific content obtained through searching for purpose of sharing.

In this embodiment, the user copies and pastes the critical information of the content locally collected into various social networks for purpose of sharing; and in other embodiments, the user may also copy and paste the critical information of the content locally collected into session windows of various instant-session application programs for purpose of sharing.

It should be appreciated that, the sharing module 440 further supports extension of sharing interfaces. Sharing interfaces can be established between the local favorites folder and the social networking websites in advance so that the user can directly send the content of the local favorites folder to the social networking websites, thus achieving the function of one-touch sharing. For example, sharing interfaces are preset in the sharing module 440; and when the content to be shared is found by the user in the local favorites folder through searching, the user long-presses the content to be shared. Then, a dialog box that displays a preset sharing interface such as "sharing to Sina MicroBlog", "sharing to Qzone" or the like pops up in the sharing module 440, and the user can select a sharing interface therefrom and directly share the content to be shared to the corresponding social networking website, thus achieving one-touch sharing.

Preferably, after the content to be shared is selected by the user, the sharing module 440 searches for the latest related information and the downloading address from the network by taking the critical information to be shared as an index, and extracts critical information from the latest related information obtained through searching so that the user can share the critical information to the friends thereof.

The aforesaid solutions classify the content currently browsed according to the type thereof, and locally store the critical information of the content currently browsed according to a save format corresponding to the type of the content so that the content can be sorted and collected by the user. Because only the critical information of the content currently browsed is saved, as much critical information as possible can be saved in the existing storage space; and the user can quickly find the content to be shared according to the type of the content, copy and paste the critical information corresponding to the content to be shared into various social networking websites for purpose of sharing so that the user can search for information corresponding to the critical information from a network according to the critical information, thus achieving the purpose of sharing the contents saved in the memory card of a mobile terminal.

Furthermore, it is apparent to those skilled in the art, the present disclosure also provides a mobile terminal, which comprises a non-transitory program storage medium and a processor. The non-transitory program storage medium stores a program executed by die processor to perform the method as described in above. Furthermore, it is apparent to those skilled in the art that, carious modules 310-330 as shown in FIG. 3 and various modules 410-440 as shown in FIG. 4 are software modules respectively. In another aspect, it is well-known that various software modules inherently are stored in the non-transitory program storage medium and executed by the processor to perform the related functions respectively.

In order to achieve a thorough understanding of this application, specific details such as specific system structures, interfaces and technologies have been described above for purpose of description rather than to limit this application. However, those skilled in the art should be appreciated that, this application may also be achieved in other embodiments without these specific details. In other cases, a detailed description of well-known apparatuses, circuits and methods is omitted in order to prevent the description of this application from being obscured by unnecessary details.

What is claimed is:

1. An intelligent collecting and sharing method, comprising the following steps of:
    predefining, by a first mobile terminal, critical information to be saved and a save format of the critical information according to types of contents supported by the first mobile terminal;
    acquiring, by the first mobile terminal, a type of a content currently browsed, wherein the type is a picture, a webpage, a fiction, a music or an application;
    determining, by the first mobile terminal, whether the type of the content currently browsed is one of the types of contents supported by the first mobile terminal; and receiving a collecting command by the first mobile terminal when the type of the content currently browsed is supported by the first mobile terminal, and calling a screenshot function of the first mobile terminal to save a content to be shared in the form of a picture by the first mobile terminal when the type of the content currently browsed is not supported by the first mobile terminal;
    when receiving the collecting command, classifying the content currently browsed according to the type of the content currently browsed and storing the critical information corresponding to the content currently browsed in a local favorites folder according to the save format corresponding to the type of the content currently browsed by the first mobile terminal; and
    when receiving a sharing command, opening the local favorites folder automatically and searching for the content to be shared in the local favorites folder based on the type of the content currently browsed by the first mobile terminal, and copying and pasting latest critical information by the first mobile terminal directly without changing a format of the latest critical information for purpose of sharing to a second mobile terminal, to allow the second mobile terminal to search for latest content on a network based on the latest critical information;
    wherein after searching for the content to be shared and before copying and pasting the latest critical information, the method further comprises:
    the first mobile terminal selecting the critical information corresponding to the content to be shared, searching for the latest content by taking the selected critical information as an index and downloading an address from the network, and extracting the latest critical information from the latest content.

2. The intelligent collecting and sharing method of claim 1, wherein:
    the collecting command and the sharing command are triggered through a combination of two arbitrary keys, wherein the collecting command and the sharing command are triggered by using the two keys in reversed orders.

3. The intelligent collecting and sharing method of claim 1, wherein:
    the storing the critical information corresponding to the content currently browsed in the local favorites folder according to the save format corresponding to the type of the content currently browsed comprises:
    storing the critical information corresponding to the content currently browsed in a folder for the type of the content currently browsed in the local favorites folder according to the save format corresponding to the type of the content currently browsed.

4. The intelligent collecting and sharing method of claim 3, wherein:

the opening the local favorites folder automatically to allow the user to search for the content to be shared in the local favorites folder based on the type of the content currently browsed comprises:

opening the folder for the type of the content to be shared in the local favorites folder automatically to allow the user to search for the content to be shared in the local favorites folder based on the type of the content currently browsed.

5. An intelligent collecting and sharing method, comprising the following steps of:

acquiring, by a first mobile terminal, a type of a content currently browsed, wherein the type is a picture, a webpage, a fiction, a music or an application;

determining, by the first mobile terminal, whether the type of the content currently browsed is one of the types of contents supported by the first mobile terminal;

receiving the collecting command by the first mobile terminal when the type of the content currently browsed is supported by the first mobile terminal, and calling a screenshot function of the first mobile terminal to save the content to be shared in the form of a picture by the first mobile terminal when the type of the content currently browsed is not supported by the first mobile terminal;

when receiving a collecting command, classifying the content currently browsed according to the type of the content currently browsed and storing critical information corresponding to the content currently browsed in a local favorites folder according to a save format of the critical information corresponding to the type of the content currently browsed by the first mobile terminal; and when receiving a sharing command, opening the local favorites folder automatically and searching for the content to be shared in the local favorites folder based on the type of the content currently browsed by the first mobile terminal, and copying and pasting latest critical information by the first mobile terminal directly without changing a format of the latest critical information for purpose of sharing to a second mobile terminal, to allow the second mobile terminal to search for latest content on a network based on the latest critical information;

wherein after searching for the content to be shared and before copying and pasting the latest critical information, the method further comprises:

the first mobile terminal selecting the critical information corresponding to the content to be shared, searching for the latest content by taking the selected critical information as an index and downloading an address from the network, and extracting the latest critical information from the latest content.

6. The intelligent collecting and sharing method of claim 5, wherein before the step of acquiring the type of the content currently browsed, the intelligent collecting and sharing method further comprises:

predefining, by the first mobile terminal, the critical information to be saved and the save format of the critical information according to the types of contents supported by the first mobile terminal.

7. The intelligent collecting and sharing method of claim 5, wherein:

the collecting command and the sharing command are triggered through a combination of two arbitrary keys, wherein the collecting command and the sharing command are triggered by using the two keys in reversed orders.

8. The intelligent collecting and sharing method of claim 5, wherein the method further comprises providing extension of sharing interfaces established between the local favorites folder and social networking websites in advance so that the user is able to directly send the content to be shared in the local favorites folder to the social networking websites.

9. The intelligent collecting and sharing method of claim 5, wherein:

the storing the critical information corresponding to the content currently browsed in the local favorites folder according to the save format corresponding to the type of the content currently browsed comprises:

storing the critical information corresponding to the content currently browsed in a folder for the type of the content currently browsed in the local favorites folder according to the save format corresponding to the type of the content currently browsed.

10. The intelligent collecting and sharing method of claim 9, wherein:

the opening the local favorites folder automatically to allow the user to search for the content to be shared in the local favorites folder based on the type of the content currently browsed comprises:

opening the folder for the type of the content to be shared in the local favorites folder automatically to allow the user to search for the content to be shared in the local favorites folder based on the type of the content currently browsed.

11. The intelligent collecting and sharing method of claim 5, wherein the critical information comprises a picture and a tag if the type of the content currently browsed is the picture, comprises a website and a title of a webpage if the type of the content currently browsed is the webpage, comprises a title and an author of a fiction if the type of the content currently browsed is the fiction, comprises a title and an artist of a music if the type of the content currently browsed is the music, and comprises an application name if the type of the content currently browsed is an application.

12. The intelligent collecting and sharing method of claim 5, wherein the local favorites folder is in the mobile terminal; the save format is predefined according to types of contents supported by the mobile terminal.

13. A mobile terminal, comprising a processor and a memory, the processor being coupled to the memory, the memory comprising an acquiring module, a collecting module and a sharing module, wherein:

the acquiring module is configured to acquire a type of a content currently browsed, wherein the type is a picture, a webpage, a fiction, a music or an application, and the acquiring module is further configured to transmit the type of the content currently browsed to the collecting module, wherein the type of a content currently browsed is one of types of contents supported by the first mobile terminal;

the collecting module is configured to receive the type of the content currently browsed, and classify the content currently browsed according to the type of the content currently browsed and store critical information corresponding to the content currently browsed in a local favorites folder according to a save format of the critical information corresponding to the type of the content currently browsed when a collecting command triggered by the user is received, and the collecting module is further configured to transmit the critical information to the sharing module, wherein the critical information to be saved and the save format of the critical information are predefined according to the types of contents supported by the first mobile terminal, the collecting command triggered by the user is received when the type of the content currently browsed is supported by the first mobile terminal, and a screenshot function of the first mobile terminal is called to save a content to be shared in the form of the picture when the type of the content currently browsed is not supported by the first mobile terminal; and the sharing module is configured to receive the critical information; when a sharing command triggered by the user is received, the sharing module is further configured to open the local favorites folder automatically and search for the content to be shared in the local favorites folder based on the type of the content currently browsed, select the critical information corresponding to the content to be shared, search for the latest content by taking the selected critical information as an index and download an address from the network, extract latest critical information from the latest content, copy and paste the latest critical information for purpose of sharing to an additional mobile terminal directly without changing a format of the latest critical information, to allow the additional mobile terminal to search for latest content on a network based on the latest critical information.

14. The mobile terminal of claim 13, wherein the acquiring module is further configured to predefine the critical information to be saved and the save format of the critical information according to the types of contents supported by the mobile terminal.

15. The mobile terminal of claim 13, wherein the mobile terminal further comprises a determining module, the determining module is configured to receive the type of the content currently browsed from the acquiring module, determine whether the type of the content currently browsed is one of the types of contents supported by the mobile terminal, and transmit the determination result and the type of the content currently browsed to the collecting module; and the collecting module is further configured to receive the determination result and the type of the content currently browsed, and receive the collecting command triggered by the user when the type of the content currently browsed is supported by the mobile terminal, or call a screenshot function of the mobile terminal to save the content to be shared in the form of a picture when the type of the content currently browsed is not supported by the mobile terminal.

16. The mobile terminal of claim 13, wherein:
the collecting command and the sharing command are triggered through a combination of two arbitrary keys, wherein the collecting command and the sharing command are triggered by using the two keys in reversed orders.

17. The mobile terminal of claim 13, wherein the collecting module is configured to store the critical information corresponding to the content currently browsed in a folder for the type of the content currently browsed in the local favorites folder according to the save format of the critical information corresponding to the type of the content currently browsed.

18. The mobile terminal of claim 13, wherein the sharing module is configured to open the folder for the type of the content to be shared in the local favorites folder automatically to allow the user to search for the content to be shared in the local favorites folder based on the type of the content currently browsed.

* * * * *